United States Patent [19]

Charron et al.

[11] Patent Number: 5,741,095
[45] Date of Patent: Apr. 21, 1998

[54] CUTTING TOOL AND INSERT THEREFOR

[75] Inventors: Mike Charron, Royal Oak; Foye Powell, Troy; Lee Reiterman, Royal Oak, all of Mich.

[73] Assignee: Valenite Inc., Madison Hts., Mich.

[21] Appl. No.: 790,483

[22] Filed: Jan. 13, 1997

Related U.S. Application Data

[63] Continuation of Ser. No. 31,002, Mar. 12, 1993, abandoned.

[51] Int. Cl.$^6$ .................................... B23C 5/20; B23C 5/02
[52] U.S. Cl. .................... 407/42; 407/113; 407/48; 407/53; 407/62
[58] Field of Search .................. 407/42, 48, 53, 407/54, 55, 62, 113

[56] References Cited

U.S. PATENT DOCUMENTS

| | | | |
|---|---|---|---|
| 4,252,480 | 2/1981 | Minuzo et al. | 407/113 |
| 4,566,827 | 1/1986 | Neumueller | 407/113 |
| 4,618,296 | 10/1986 | Allaire et al. | 407/42 |
| 4,834,591 | 5/1989 | Tsujimura et al. | 407/113 |
| 4,838,739 | 6/1989 | Stashko | 407/42 |
| 5,190,419 | 3/1993 | Lindberg et al. | 407/42 |

*Primary Examiner*—Jack W. Lavinder
*Attorney, Agent, or Firm*—Mary K. Cameron

[57] ABSTRACT

A ball end mill and an insert for use in the cutting tool. The insert has a constant angle maintained along the entire clearance face.

20 Claims, 1 Drawing Sheet

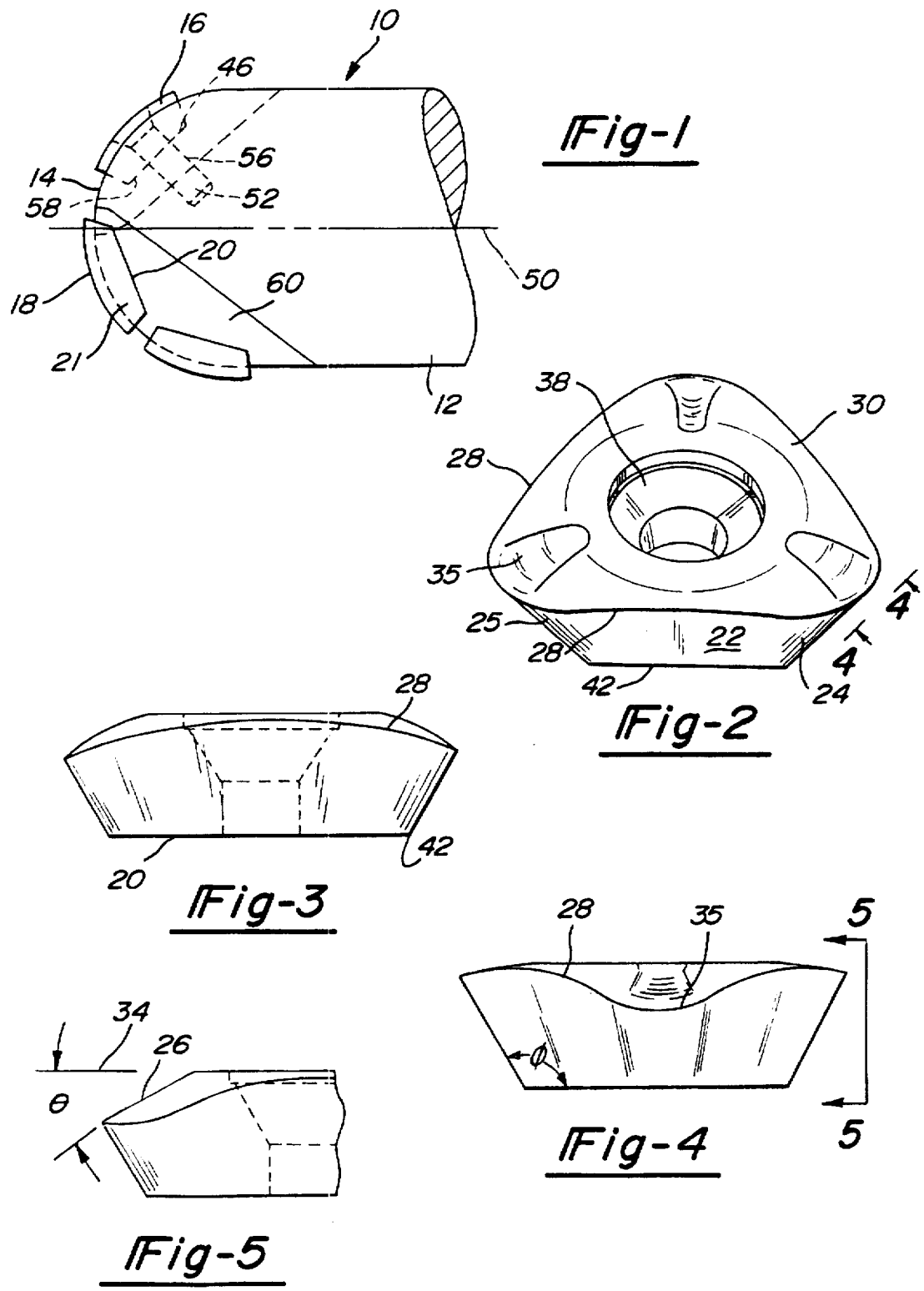

5,741,095

1

CUTTING TOOL AND INSERT THEREFOR

This is a continuation of U.S. Pat. application Ser. No. 08/031,002 filed Mar. 12, 1993 now abandon.

BACKGROUND OF THE INVENTION

1. Field of the Invention.

The present invention relates to an improved cutting tool and inserts for use in the cutting tool.

The present invention further relates to improved ball nose end mills which require only one insert to form arcuate cuts of substantially uniform radius.

The present invention further relates to an improved cutting insert having an upwardly sloping convex first major face with a constant clearance angle maintained along the entire clearance face of the insert.

2. Description of the Related Art.

Ball nose end mills are known which can perform omni-directional cutting and contouring of irregular shapes on workpieces. One class of such prior art tools features cutting edges integrally formed with the cutter body or cemented carbide cutting elements brazed onto the cutter body. Such designs require considerable manufacturing effort and their cutting edges can be reground or sharpened only with considerable difficulty and with the required use of a suitable grinding machine. After regrinding, a loss of diametrical size occurs, necessitating careful machine adjustments when the reground tool is returned to service. Those tools with integrally formed cutting blades are of a single material and therefore are limited to use on certain narrow categories of workpiece materials. One such known brazed tool is disclosed in U.S. Pat. No. 4,132,493.

A second class of known ball nose end mills features indexable cutting elements or inserts. Such tools are disclosed in U.S. Pat. Nos. 4,175,896 and 4,252,480. The '896 patent discloses an insert with a conical rake or chip engaging surface while the '400 patent discloses inserts mounted in a so-called stand up position with each insert's minor dimensions lying behind the cutting edge and receiving the cutting forces generated.

Allaire et.al., U.S. Pat. No. 4,618,296 discloses a ball nose end mill and inserts therefor. The inserts have equilateral polygonal shapes, and have a clearance face which varies around the insert in order to provide clearance during radial cutting. This differs from the present invention wherein the clearance face of the insert of the present invention is uniform all along the clearance face. In addition, Allaire et al required that there be at least two cutting inserts to effect arcuate cuts during radial cutting. The present invention requires just one insert for arcuate cuts during radial cutting operations.

SUMMARY OF THE INVENTION

The present invention is an improved cutting tool and insert therefor for generating arcuate profiles. The tool is a ball nose end mill having a cylindrical shank terminating in a spherically shaped cutting end. The cutting end includes at least one cavity for lay-down mounting receipt of a cutting insert. The inserts present an arcuate cutting edge with a radius of curvature equal to the radius of the cut to be taken. The arcuate cutting edge of the insert extends radially upwardly from the longitudinal axis of the shank. Each insert has first and second major polygonal faces connected by flank surfaces. The first major face includes convex portions intersecting each flank surface in an acute angle to form arcuate cutting edges along the sides of the polygon. A clearance face is formed along the first major surface which is uniform along the entire perimeter of the insert relative to a line drawn through the center of the insert normal to the second major face. The second major face is planar and intersects each flank surface at a neutral to an obtuse angle. In other words, the angle so formed is at least 90 degrees.

BRIEF DESCRIPTION OF THE DRAWINGS

FIG. 1 is a detailed sectional view of the cutting end of the cutting tool of the present invention showing the placement of inserts on the tool.

FIG. 2 is a top perspective view of the insert of the present invention.

FIG. 3 is an on side view of the insert of the present invention.

FIG. 4 is a side view of the insert of the present invention taken along line 4—4.

FIG. 5 is a detail of the insert showing the edge profile of the insert taken along line 5—5 detailing the clearance angle.

DETAILED DESCRIPTION OF THE PREFERRED EMBODIMENT

Turning now to the Figures, wherein like numerals refer to like structures, cutting tool 10, which is shown as a ball nose end mill, has a cylindrical shank 12 and a spherical cutting end 14 integral to one end of the shank. The tool is rotatable about a longitudinal axis 50 to allow the tool to be rotated to generate an arcuate cut of substantially uniform radius.

The spherical cutting end has at least one, and preferably a plurality of indexable inserts 16 mounted in lay down fashion in mounting cavities 46. The inserts are polygonal in shape, and although it is contemplated that any polygonal shape can be used, it is preferred that the polygon be equilateral in form. The shape shown in the drawings is an equilateral triangular, but any polygonal shape can be made.

Each insert has first major polygonal face 18 and second polygonal major face 20 oriented opposite each other and separated by sidewall 21 which is composed of flank surfaces 22. Each flank surface is defined by the portion of the sidewall which extends from one corner 24 to the adjacent corner 25 of the insert. Two flank surfaces intersect at each corner of the polygonal shape insert. The flank surfaces may be arcuate or compound, i.e., have several intersecting surfaces, but it is preferred that each flank surface is planar in shape.

The first major face has upwardly sloping convex portions 26 which intersect each flank surface to form an arcuate cutting edge 28 at each side of the insert. The upwardly sloping convex portion 26 forms the clearance face 30 of the insert. The clearance face has a constant clearance angle around the entire clearance face of the insert. The clearance angle is measured against a line 34 which is drawn over the first major face parallel to the second major face of the insert. The clearance angle may be any constant angle from about 5 to about 25 degrees, and preferably is a constant 18 degrees around the clearance face. As can be seen in FIG. 2, where the clearance faces meet at each corner of the insert, it appears as if a depression 35 is formed. Those skilled in the art will recognize that this seeming depression is actually the continuation of the constant clearance angles around the corner radius of the insert, and that at any point along any of the clearance faces of the insert, the same constant angle is maintained. The depression is formed because the first major face is upwardly convex in shape and causes the constant clearance face angle to wrap around the corner radius of the insert. Those skilled in the art will recognize that if the first major polygonal face were planar, no seeming depression would occur at the corner radius of the insert.

The insert may have a centrally located aperture 38 which extends through the body of the insert to allow the insert to be mounted in the mounting cavities in a manner to be hereinafter described. The aperture is counterbored so that the fastener is flush with the surface of the insert.

At the intersection of the second major face and the flanks, an angle is formed. The angle φ is 90 degrees or larger, so that it forms a neutral to positive angle. Preferably, angle φ is obtuse. The obtuse angle forms a positive angle, and may be about 30 degrees. Rake edges 42 are formed at the intersection of the second major face and the flanks, and those skilled in the art recognize they may or may not be identical, depending upon the form the polygon takes. It is preferred that the polygon be equilateral, and the rake edges are therefore identical.

Turning to FIG. 1, the mounting cavities have a threaded cavity 56 in the floor 58 of the cavity 46 which is preferably normal to the floor and accepts mounting means 52, depicted as a screw which passes through the insert to securely mount the insert in place.

Although it is contemplated that this invention utilizes at least one cutting insert, it is preferred that two or more inserts be used. However, the number of inserts used depends upon the size of the inserts, as well as the desired radius of the arcuate profile to be machined in a work piece by the tool of the invention. In the case of a second insert, there is provided a mounting cavity positioned on the cutting end with respect to the first cavity such that the second insert placed in lay down fashion presents an active arcuate cutting edge whose cutting zone partially overlaps that of the first insert's cutting edge substantially in a common plane passing through the shank axis, thereby allowing the cutting tool to generate an arcuate cut of substantially uniform radius. Additionally, those skilled in the art recognize that peripheral inserts (not shown) could be mounted along a portion of the cylindrical shank to extend the depth of the cut taken by the disclosed cutting tool.

At least one chip gullet 60 is provided in the cutting tool which intersects at least one mounting cavity when there is only one insert in the cutting end of the tool, and preferably all the mounting cavities when multiple inserts are used, to generate the arcuate cut such that the chips formed during cutting are directed by the flank surfaces into the chip gullet and away from the cutting action.

The specific embodiments of this invention have been described for the sake of example only. Many variations will be apparent to those of ordinary skill in the art without departing from the scope and spirit of the invention.

I claim:

1. A cutting tool comprising:
a cylindrical shank terminating in a spherical cutting end and including at least one mounting cavity shaped for receipt in lay-down fashion of an indexable cutting insert, and means mounting the indexable cutting insert to the mounting cavity, the indexable cutting insert comprising first and second polygonal major faces and flank surfaces forming the sides of a polygon, said second major face being planar and intersecting each flank forming an included angle of at least 90 degrees, the first major face including upwardly sloping convex portions, each convex portion intersecting a flank face to form an arcuate cutting edge along a side of the polygon, said convex portions including clearance face portions extending along said first major face rearwardly from said cutting edges, the slope of said clearance faces defining a clearance angle measured relative to a line drawn over the first major face parallel to the second major face and through the center of the insert normal to the second major face, said clearance angle being constant as measured around the entire perimeter of the insert, the cavity oriented such that an arcuate cutting edge of said insert placed in lay-down fashion in the cavity will extend radially outwardly from a longitudinal axis of the shank.

2. The cutting tool of claim 1, wherein all said arcuate cutting edges are identical.

3. The cutting tool of claim 1, further comprising at least one chip gullet respectively intersecting the mounting cavity such that chips formed by the arcuate cutting edges are directed by the planar flank surfaces into the chip gullet.

4. The cutting tool of claim 1, wherein said clearance angle is constant at an angle of between about 5 to 25 degrees.

5. The cutting tool of claim 4, wherein said clearance angle is constant at an angle of about 18 degrees.

6. The cutting tool of claim 1, wherein said first and second polygonal major faces are equilateral and have identical flank surfaces.

7. The cutting tool of claim 1, wherein each said flank is planar.

8. The cutting tool of claim 1, wherein the angle formed by the intersection of the second major face and the flank is obtuse.

9. The cutting tool of claim 1 further including a second mounting cavity, said second cavity positioned on the cutting end with respect to the first cavity such that a second insert placed in lay down fashion therein presents an active arcuate cutting edge having a cutting zone which partially overlaps the cutting zone of the first insert and such that an arcuate cut of substantially uniform radius is generated by the first and second inserts.

10. The cutting tool of claim 1 wherein the second major face rests upon a planar mounting floor of the mounting cavity.

11. The cutting tool of claim 10, wherein each planar mounting floor is intersected by a threaded cavity in the spherical cutting end for receipt of an insert mounting screw.

12. The cutting tool of claim 11 wherein said first and second major faces are minimally spaced at corners of the polygon.

13. An indexable cutting insert comprising:
first and second polygonal major faces and flank surfaces forming the sides of a polygon, said second major face being planar and intersecting each flank surface forming an included angle of at least 90 degrees, the first major face including upwardly sloping convex portions, each convex portion intersecting a flank surface to form an arcuate cutting edge along a side of the polygon, said convex portions including corresponding clearance face portions extending along said first major face rearwardly from said cutting edges, the slope of said clearance faces defining a clearance angle relative to a line drawn over the first major face parallel to the second major face and through the center of the insert normal to the second major face, said clearance angle being constant as measured around the entire perimeter of the insert.

14. The insert of claim 13, wherein said clearance angle is from about 5 to 25 degrees.

15. The insert of claim 14, wherein said clearance angle is about 18 degrees.

16. The insert of claim 13, wherein said first and second polygonal major faces are equilateral and have identical flank surfaces.

17. The insert of claim 13, wherein said flank surfaces are planar.

18. The insert of claim 13, wherein said arcuate cutting edges are identical.

19. The insert of claim 13, further including a centrally located aperture extending through the insert and normal to the first and second major faces.

20. The insert of claim 13, wherein the angle formed by the intersection of the second major face and the flank is obtuse.

* * * * *